United States Patent [19]

Murashige et al.

[11] Patent Number: 5,149,762
[45] Date of Patent: Sep. 22, 1992

[54] PROCESS FOR PREPARATION OF SILICON-MODIFIED THERMOPLASTIC RESIN

[75] Inventors: Yoshio Murashige, Kawasaki; Junko Soga, Otake, both of Japan

[73] Assignee: Mitsubishi Rayon Company Ltd., Tokyo, Japan

[21] Appl. No.: 433,135

[22] Filed: Nov. 8, 1989

[30] Foreign Application Priority Data

Nov. 8, 1988 [JP] Japan .................................. 63-281817
Nov. 8, 1988 [JP] Japan .................................. 63-281818

[51] Int. Cl.$^5$ .................... C08G 77/26; C08G 69/26; C08G 69/28; C08K 5/54
[52] U.S. Cl. .................................. 528/353; 528/26; 528/28; 528/38; 528/125; 528/126; 528/128; 528/170; 528/172; 528/173; 528/182; 528/188; 528/229; 528/351; 524/267; 525/100; 525/431
[58] Field of Search .............. 528/353, 125, 126, 128, 528/351, 26, 170, 172, 28, 173, 38, 182, 188, 229; 525/100, 431; 524/267

[56] References Cited

U.S. PATENT DOCUMENTS

| | | | |
|---|---|---|---|
| 4,395,527 | 7/1983 | Berger | 528/26 |
| 4,734,464 | 3/1988 | Biensan | 528/353 |
| 4,959,404 | 9/1990 | Nakane et al. | 528/27 |

OTHER PUBLICATIONS

Abstract: 30th National SAMPE Symposium Mar. 19-21, 1985; *Modified Polyimides by Silicone Incorporation* by Abe Berger MST Chemicals, Inc. Rahway, NJ 07065; pp. 64-73.

*Primary Examiner*—John Kight, III
*Assistant Examiner*—P. Hampton-Hightower
*Attorney, Agent, or Firm*—Oblon, Spivak, McClelland, Maier & Neustadt

[57] ABSTRACT

A silicon-modified thermoplastic resin is prepared by heating a mixture comprised of 10 to 90% by weight of an imide group-containing thermoplastic resin and 90 to 10% by weight of a modified silicon compound having an amino group—$NH_2$ at one end of the molecule and an alkyl group —$C_nH_{2n+1}$ (n is an integer of at least 1) at the other end of the molecule, to chemically bond the imide group-containing thermoplastic resin to the modified silicon compound.

9 Claims, No Drawings

PROCESS FOR PREPARATION OF SILICON-MODIFIED THERMOPLASTIC RESIN

BACKGROUND OF THE INVENTION

1. Field of the Invention

The present invention relates to a process for the preparation of a silicon-modified thermoplastic resin having a good transparency, heat resistance, impact resistance, moldability and mechanical strength

2. Description of the Related Art

An imide group-containing resin has an excellent heat resistance such that the practical use temperature is 120° to 220° C., this heat resistance can be varied by changing the content of the imide monomer unit, and the imide group-containing resin has a relatively good balance of properties such as transparency, mechanical properties and moldability. Therefore, the imide group-containing resin is widely used in various fields for automobile parts, electric parts, additive polymers to polymer alloys, and the like, and other uses of this resin as a resin having especially good heat resistance and moldability in combination have been investigated and developed.

Nevertheless, this resin does not have a satisfactory impact strength; and for example, the notched impact strength is 3 to 7 kg.cm/cm (23° C., 3.2 mm in thickness), and further, the saturation water absorption is as high as 0.2 to 1%. Accordingly, there is an urgent used to improve the impact resistance and reduce the water absorption, while maintaining the original high heat resistance and transparency.

As the means for improving the impact resistance of an imide group-containing thermoplastic resin, there have been proposed a method in which a graft polymer formed by grafting styrene, acrylonitrile or methyl methacrylate to a butadiene polymer or a styrene/butadiene copolymer, such as an ABS resin or an MBS resin, is blended in the above-mentioned imide group-containing resin, a method in which a graft polymer formed by grafting styrene or methyl methacrylate to polybutyl acrylate or a butadiene/butyl acrylate copolymer is blended in the above-mentioned imide group-containing resin, and a method in which a polycarbonate is blended in the above-mentioned imide group-containing resin.

According to these proposals, the impact resistance is improved, but the characteristics of the imide group-containing thermoplastic resin, especially the transparency and heat resistance, are drastically degraded and therefore, many practical problems remain unsolved.

SUMMARY OF THE INVENTION

A primary object of the present invention is to overcome the above-mentioned defects of the conventional techniques and provide a process in which a silicon-modified thermoplastic resin having an excellent impact resistance and low hygroscopicity is prepared while maintaining inherent good characteristics thereof such as an excellent transparency, heat resistance, and moldability.

In accordance with the present invention, there is provided a process for the preparation of a silicon-modified thermoplastic resin, which comprises heating a mixture comprising 10 to 90% by weight of an imide group-containing thermoplastic resin and 90 to 10% by weight of a modified silicon compound having an amino group —$NH_2$ at one end of the molecule and an alkyl group —$C_nH_{2n+1}$ (n is an integer of at least 1) at the other end of the molecule to chemically bond the imide group-containing thermoplastic resin to the modified silicon compound.

DESCRIPTION OF THE PREFERRED EMBODIMENTS

When carrying out the process of the present invention, preferably, an imide group-containing thermoplastic resin is dissolved in an inert solvent and a modified silicon compound having an amino group —$NH_2$ at one end of the molecule and an alkyl group —$C_nH_{2n+1}$ (n is an integer of at least 1) at the other end of the molecule is incorporated in an amount of 10 to 90% by weight based on the total amount of the whole resins, and the mixture is heated to effect reaction between the two components. A solvent capable of dissolving both the imide group-containing thermoplastic resin and the modified silicon compound therein, but which does not react with the components and does not inhibit a reaction therebetween, is preferably used as the inert solvent. For example, chloroform, methylene chloride and trichlene are preferably used. These solvents can be used singly or in the form of a mixture of two or more thereof. By using the inert solvent, a diffusion and contact of the imide group-containing thermoplastic resin and the modified silicon compound can be smoothly accomplished and a reaction therebetween rapidly advanced.

In the above-mentioned process, the imide group-containing thermoplastic resin is reacted with the modified silicon compound in the solution state. Alternatively, a process can be adopted in which the components are kneaded and reacted without using a solvent in a single-screw or twin-screw extruder, and the reaction mixture is directly extruded.

The chemical reaction between the two components by thermal mixing has not been completely elucidated, but it is believed that imide bond units present in the molecule chain of the imide group-containing thermoplastic resin are reacted with the amino groups of the modified silicon compound, and the formed polymer comes to have a comb-like structure comprising an imide group-containing polymer backbone to which the modified silicon compound is bonded as branches.

The modified silicon compound used in the present invention has an amino group —$NH_2$ at one end of the molecule and an alkyl group —$C_nH_{2n+1}$ (n is an integer of at least 3) at the other end thereof. Polydimethylsiloxane having both the ends thus modified is preferable, and such polydimethylsiloxane having a weight average molecular weight of 500 to 35,000 as determined by the GPC method is especially preferable. Commercially available products marketed under the tradename of Silicone Monoamine X-22-171AS by Shin-Etsu Chemical Co. (modified dimethylpolysiloxane having an amino group —$NH_2$ at one end of the molecule and an n-propyl group at the other end thereof) are preferably used as the modified silicon compound.

The molecular weight of the imide group-containing thermoplastic resin is not particularly critical, but preferably the imide group-containing thermoplastic resin has a weight average molecular weight of 50,000 to 500,000 as determined by the GPC method. The imide group-containing thermoplastic resin has, in the polymer chain, imide bond units represented, for example, by the following formula:

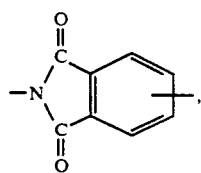

(1)

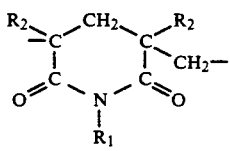

(2)

wherein $R_1$ represents a hydrogen atom or a substituted or unsubstituted alkyl, cycloalkyl, aryl, aralkyl or alkaryl group having 1 to 20 carbon atoms, and $R_2$ represents a hydrogen atom or an alkyl group having 1 to 20 carbon atoms,
or

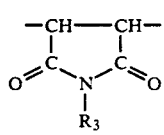

(3)

wherein $R_3$ represents a hydrogen atom or a substituted or unsubstituted cycloalkyl, aryl, aralkyl or alkaryl group having 1 to 20 carbon atoms.

As specific examples of the resin having imide bond units represented by formula (1), there can be mentioned a polyamide-imide (Torlon supplied by Amoco) having the following recurring units:

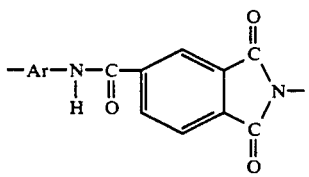

wherein Ar represents an aryl group having 6 to 10 carbon atoms, a polyether-imide (Ultem supplied by GE) having the following recurring units:

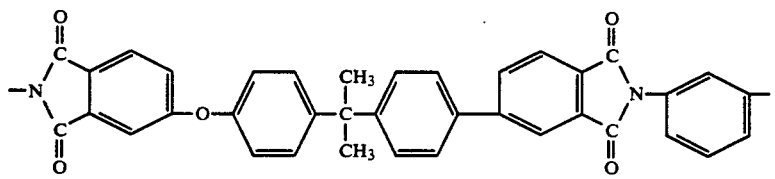

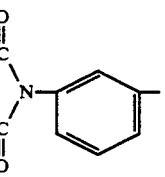

and a polypyromellitimide (Vespel supplied by Du Pont) having the following recurring units:

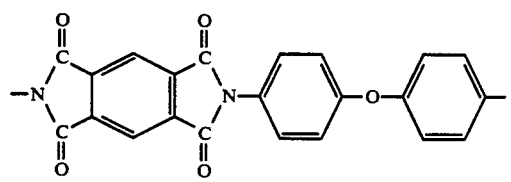

The resin containing the imide bond units represented by formula (2) is a homopolymer or copolymer having cyclic imide units represented by formula (2). This resin can be obtained, for example, by reacting a methacrylic resin with ammonia, a primary amine compound $R_1NH_2$ or a compound capable of forming a primary amine compound under heating (for example, 1,3-dimethylurea) at a temperature of 100° to 350° C.

As the resin having the imide bond units represented by formula (3), there can be mentioned, for example, a resin obtained by reacting a copolymer of maleic anhydride and other copolymerizable monomer with ammonia, a primary amine compound $R_3NH_2$ or a compound capable of forming a primary amine under heating, and a copolymer of an N-substituted maleimide compound and other copolymerizable monomer.

From the viewpoint of the heat resistance, preferably the imide bond units represented by the above-mentioned formula (1), (2) or (3) are contained in an amount of at least 5% by weight in the imide group-containing thermoplastic resin.

As the constituent of the copolymer in the resin having the imide bonds units represented by the above-mentioned formula (1), (2) or (3), there can be mentioned, for example, acrylonitrile, styrene, α-methylstyrene, an alkyl methacrylate and an acrylic acid ester.

In view of the heat resistance and strength of the obtained resin, the modified silicon compound is added in an amount of 10 to 90% by weight based on the sum of the imide group-containing thermoplastic resin and the modified silicon compound In the process of the present invention, the solution of the mixture of the imide group-containing resin and the modified silicon compound is preferably heated at a temperature of 30° to 300° C., and an appropriate temperature is selected according to the kind of inert solvent.

The resin obtained according to the process of the present invention has an excellent heat resistance and transparency, and a high impact resistance, and the resin can be widely used in various fields as automobile parts, modifiers for polymer alloys, electric parts, and the like.

The present invention will now be described in detail with reference to the following examples, that by no means limit the scope of the invention.

In the examples, all of "parts" are by weight.

In the examples, the characteristics of polymers were determined by the following methods.

(1) The infrared absorption spectrum was determined by the KBr cell coating method using an infrared spectrophotometer (Model 260-30 supplied by Hitachi Ltd.).

(2) The weight average molecular weights of the starting imide group-containing thermoplastic resin and modified silicon compound were expressed in terms of that of polystyrene determined by the GPC method (apparatus Model LC-3A supplied by Shimadzu Corp. and two columns $GMH_6$ supplied by Tosoh Corp.)

(3) The heat distortion temperature (HDT) was determined according to ASTM D-648.

(4) The Izod impact strength (notched) was determined according to ASTM D-256.

(5) The total luminous transmittance (%) of the molded article was determined according to ASTM D-1003.

Test pieces used for the above-mentioned measurements (3), (4) and (5) were prepared by pelletization using an extruder described below and injection molding using an injection molding machine described below.

1. Extruder

A twin-screw extruder having a screw diameter of 30 mm and a screw temperature of 300° C. (supplied by Isuzu).

2. Injection Molding Machine

An injection molding machine having a cylinder temperature of 320° to 340° C. (Model V-17-65 supplied by the Japan Steel Works).

EXAMPLE 1

A three-neck flask having an inner volume of 500 ml and equipped with a stirrer was charged with 42.5 g of an acrylonitrile/styrene/phenylmaleimide copolymer (weight ratio=10/55/35), 400 ml of chloroform was added, and the mixture was stirred to dissolved the solution. Then 7.5 g of a modified silicon compound (modified dimethylpolysiloxane having an amino group —$NH_2$ at one end of the molecule and an n-propyl group at the other end thereof; marketed under the tradename of X-22-171AS by Shin-Etsu Chemical Co.; weight average molecular weight=900) was added to the above solution and the mixture was stirred at 50° C. for 12 hours. After the reaction, the reaction solution was dropped into a beaker charged with 2 l of methanol, and the formed polymer was recovered. The amount of recovered polymer was 49.5 g. When the infrared absorption spectrum of the obtained polymer was determined, an absorption attributed to -Si-O-Si was observed at 1190 to 1170 $cm^{-1}$. The recovery ratio of the polymer was 99%, and the modified silicon compound was soluble in methanol. Accordingly, it is considered that the starting materials used were bonded to each other. The physical properties of the obtained polymer were measured, and the results are shown in Table 1.

EXAMPLES 2 THROUGH 8 AND COMPARATIVE EXAMPLES 1 THROUGH 4

Silicon-modified thermoplastic resins were prepared under the same conditions as described in Example 1 except that the amount of the modified silicon compound added was changed to up to 95% by weight based on the sum of the two starting materials, and the formed polymers were recovered. It was found that with an increase of the amount of the modified silicon compound added, the total luminous transmittance and elastic modulus were increased and when the amount of the modifying silicon compound added was about 40 to about 60% by weight, a maximum value of the impact strength was obtained. The physical properties of the polymers were measured, and the results are shown in Table 1.

TABLE 1

| | Amount of modified silicon compound (X-22-171AS) (% by weight) | Total luminous transmittance (%) | HDT (18.6 $kg/cm^2$) | Izod impact strength, ¼", 23° C. (kg · cm/cm) | Solubility in chloroform |
| --- | --- | --- | --- | --- | --- |
| Example 1 | 15 | 89 | 145 | 25 | soluble |
| Example 2 | 20 | 89 | 145 | 25 | " |
| Example 3 | 30 | 91 | 145 | 25 | " |
| Example 4 | 40 | 91 | 150 | 30 | " |
| Example 5 | 50 | 93 | 150 | 30 | " |
| Example 6 | 60 | 93 | 150 | 30 | " |
| Example 7 | 70 | 93 | 155 | 25 | " |
| Example 8 | 85 | 93 | 155 | 20 | " |
| Comparative Example 1 | 0 | 89 | 140 | 7 | " |
| Comparative Example 2 | 5 | 89 | 140 | 7 | " |
| Comparative Example 3 | 95 | 93 | 155 | 15 | " |
| Comparative Example 4 | Polydimethylsiloxane (molecular weight = 5,000), 10 | opaque | 140 | 7 | " |

EXAMPLE 9

A three-neck flask having an inner volume of 500 ml and equipped with a stirrer was charged with an imidized methacrylic resin (imidization degree=82% by mole; supplied by Mitsubishi Rayon Co.) containing N-methacrylimide units [$R_1$ and $R_2$ in formula (2) represent a methyl group], 400 ml of chloroform was added, and the mixture was stirred to dissolve the resin. Then 7.5 g of a modified silicon compound (X-22-161AS supplied by Shin-Etsu Chemical Co.; weight average molecular weight=900) was added to the above solution, and the mixture was stirred at 50° C. for 12 hours. After the reaction, the reaction solution was dropped into a beaker charged with 2 l of methanol, and the formed polymer was recovered. The amount of the recovered polymer was 49 g. When the infrared absorption spectrum of the obtained polymer was measured, an absorption attributed to -Si-O-Si was observed at 1190 to 1170 $cm^{-1}$ and an absorption attributed to Si-$CH_3$ was observed at 800 $cm^{-1}$. The recovery ratio of the polymer was 98% and the modified silicon compound was soluble in methanol. Accordingly, it is considered that both starting materials were bonded to each other. The physical properties of the polymers were measured, and the results are shown in Table 2.

EXAMPLES 10 THROUGH 16 AND COMPARATIVE EXAMPLES 5 THROUGH 8

Silicon-modified thermoplastic resins were prepared under the same conditions as described in Example 9 except that the amount of the added modified silicon compound was changed to up to 95% by weight based on the sum of the starting materials, and the formed polymers were recovered. It was found that with an increase of the amount of the modified silicon compound added, the total luminous transmittance and elastic modulus were increased and when the amount of the modified silicon compound added was about 30 to about 70% by weight, a maximum value of the impact strength was obtained. The physical properties of the obtained polymers were measured, and the results are shown in Table 2.

methanol, and the formed polymer was recovered. The amount of the recovered polymer was 99.3 g. When the infrared absorption spectrum of the obtained polymer was measured, an absorption attributed to -Si-O-Si was observed at 1190 to 1170 cm$^{-1}$, and the recovery ratio of the polymer was 99.3% and the modified silicon compound used was soluble in methanol. Accordingly, it is considered that both starting materials were bonded to each other. The physical properties of the obtained polymer were measured, and the results are shown in Table 3.

EXAMPLES 18 THROUGH 24 AND COMPARATIVE EXAMPLES 10 THROUGH 12

Silicon-modified thermoplastic resins were prepared under the same conditions as described in Example 17 except that the amount of the added modified silicon

TABLE 2

|  | Amount of modified silicon compound (X-22-161AS) (% by weight) | Total luminous transmittance (%) | HDT (18.6 kg/cm$^2$) | Izod impact strength, $\frac{1}{4}$", 23° C. (kg · cm/cm) | Solubility in chloroform |
| --- | --- | --- | --- | --- | --- |
| Example 9 | 15 | 90 | 145 | 2.8 | soluble |
| Example 10 | 20 | 90 | 145 | 3.0 | " |
| Example 11 | 30 | 92 | 148 | 5.8 | " |
| Example 12 | 40 | 93 | 148 | 6.0 | " |
| Example 13 | 50 | 94 | 150 | 6.1 | " |
| Example 14 | 60 | 94 | 153 | 5.9 | " |
| Example 15 | 70 | 94 | 155 | 6.1 | " |
| Example 16 | 85 | 91 | 155 | 4.2 | " |
| Comparative Example 5 | 0 | 90 | 145 | 1.7 | " |
| Comparative Example 6 | 5 | 90 | 142 | 2.0 | " |
| Comparative Example 7 | 95 | 93 | 155 | 2.3 | " |
| Comparative Example 8 | Polydimethylsiloxane (molecular weight = 5,000), 10 | opaque | 140 | 2.3 | " |

EXAMPLE 17

A three-neck flask having an inner volume of 500 ml and equipped with a stirrer was charged with 85 g of a polyether-imide (Urtem 1000 supplied by GE), 400 ml of chloroform was added, and the mixture was stirred to dissolve the polymer. Then 15 g of a modified silicon compound (X-22-171AS supplied by Shin-Etsu Chemical Co.; weight average molecular weight=900) was added to the above solution and the mixture was stirred at 50° C. for 12 hours. After the reaction, the reaction solution was dropped into a flask charged with 2 l of compound was changed to up to 95% by weight based on the sum of the two starting materials, and the formed polymers were recovered. It was found that with an increase of the amount of the modified silicon compound added, the total luminous transmittance and elastic modulus were increased and when the amount of the modified silicon compound added was about 40 to about 60% by weight, a maximum value of the impact strength was obtained. The physical properties of the obtained polymers were measured, and the results are shown in Table 3.

TABLE 3

|  | Amount of modified silicon compound (X-22-171AS) (% by weight) | Total luminous transmittance (%) | HDT (18.6 kg/cm$^2$) | Izod impact strength, $\frac{1}{4}$", 23° C. (kg · cm/cm) | Solubility in chloroform |
| --- | --- | --- | --- | --- | --- |
| Example 17 | 15 | 87 | 230 | 35 | soluble |
| Example 18 | 20 | 87 | 230 | 40 | " |
| Example 19 | 30 | 88 | 240 | 55 | " |
| Example 20 | 40 | 88 | 245 | 68 | " |
| Example 21 | 50 | 90 | 250 | 72 | " |
| Example 22 | 60 | 90 | 250 | 70 | " |
| Example 23 | 70 | 90 | 240 | 55 | " |
| Example 24 | 85 | 90 | 240 | 25 | " |
| Comparative Example 9 | 0 | 87 | 200 | 5 | " |
| Comparative Example 10 | 5 | 87 | 200 | 5 | " |
| Comparative Example 11 | 95 | 90 | 220 | 20 | " |
| Comparative Example 12 | Polydimethylsiloxane (molecular weight = | opaque | 200 | 5 | " |

TABLE 3-continued

| Amount of modified silicon compound (X-22-171AS) (% by weight) | Total luminous transmittance (%) | HDT (18.6 kg/cm²) | Izod impact strength, ⅛", 23° C. (kg · cm/cm) | Solubility in chloroform |
| --- | --- | --- | --- | --- |
| 5,000). | 10 | | | |

We claim:

1. A process for the preparation of a silicon-modified thermoplastic resin, which comprises heating a mixture comprising 10 to 90% by weight of an imide group-containing thermoplastic resin and 90 to 10% by weight of a modified silicon compound having an amino group —$NH_2$ at one end of the molecule and an alkyl group —$C_nH_{2n+1}$ (n is an integer of at least 1) at the other end of the molecule, to chemically bond the imide group-containing thermoplastic resin to the modified silicon compound.

2. A process according to claim 1, wherein the imide group-containing thermoplastic resin and the modified silicon compound are reacted in the form of a solution in an inert solvent.

3. A process according to claim 2, wherein the solution is heated at a temperature of 30° to 300° C.

4. A process according to claim 1, wherein the modified silicon compound is a modified polydimethylsiloxane having a weight average molecular weight of 500 to 35,000.

5. A process according to claim 1, wherein the imide group-containing thermoplastic resin has, in the polymer chain thereof, at least 5% by weight, based on the imide group-containing thermoplastic resin, of at least one kind of imide bond units represented by the following formulae (1), (2) and (3):

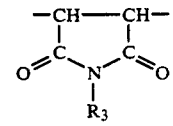
(1)

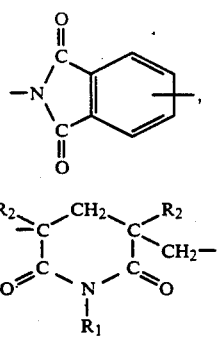

wherein $R_1$ represents a hydrogen atom or a substituted or unsubstituted alkyl, cycloalkyl, aryl, aralkyl or alkaryl group having 1 to 20 carbon atoms, and $R_2$ represents a hydrogen atom or an alkyl group having 1 to 20 carbon atoms, and wherein $R_3$ represents a hydrogen atom or a substituted or unsubstituted cycloalkyl, aryl, aralkyl or alkaryl group having 1 to 20 carbon atoms.

6. A process according to claim 1, wherein the imide group-containing thermoplastic resin is a polyetherimide having recurring units represented by the following formula:

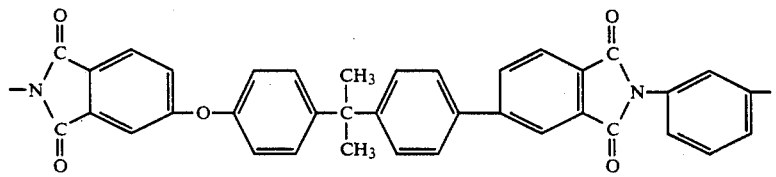

7. A process according to claim 1, wherein the imide group-containing thermoplastic resin is a polyamide-imide having recurring units represented by the following formula:

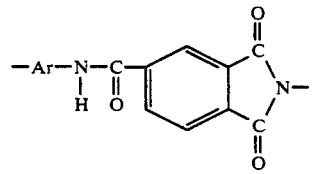

wherein Ar is an aryl group having 6-10 carbon atoms.

8. A process according to claim 1, wherein the imide group-containing thermoplastic resin is a polypyromellitimide having recurring units represented by the following formula:

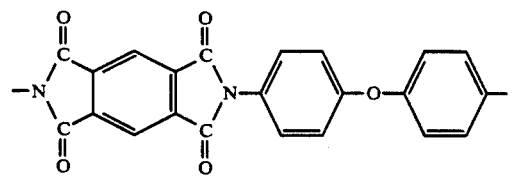

9. The silicon-modified thermoplastic resin produced according to the process of claim 1 wherein the product has an impact strength greater than and a light transmittance not substantially less than the unmodified imide group containing thermoplastic resin.

* * * * *